United States Patent
Li et al.

(10) Patent No.: US 9,671,535 B2
(45) Date of Patent: Jun. 6, 2017

(54) COLOR FILTER SUBSTRATE AND METHOD FOR FABRICATING THE SAME, AND DISPLAY PANEL

(71) Applicants: Shanghai Tianma Micro-Electronics Co., Ltd., Shanghai (CN); Tianma Micro-Electronics Co., Ltd., Shenzhen (CN)

(72) Inventors: Hong Li, Shanghai (CN); Tianyi Wu, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 14/104,923

(22) Filed: Dec. 12, 2013

(65) Prior Publication Data

US 2015/0002955 A1  Jan. 1, 2015

(30) Foreign Application Priority Data

Jun. 28, 2013 (CN) .......................... 2013 1 0270740

(51) Int. Cl.
*G02B 5/22* (2006.01)
*G02B 5/20* (2006.01)
*G02F 1/1335* (2006.01)

(52) U.S. Cl.
CPC ....... *G02B 5/201* (2013.01); *G02F 1/133514* (2013.01)

(58) Field of Classification Search
CPC .......... G02B 5/201; G02B 5/223; G02B 5/20; G02F 1/133514; G02F 2001/136222; G03F 7/0007; H04N 2209/045
USPC ..... 359/491.01, 885, 891; 427/162; 348/279
See application file for complete search history.

(56) References Cited

U.S. PATENT DOCUMENTS

| | | | |
|---|---|---|---|
| 5,619,225 A | 4/1997 | Hashimoto | |
| 6,106,743 A * | 8/2000 | Fan | ................................ 252/582 |
| 6,303,056 B1 * | 10/2001 | Fan et al. | ...................... 252/582 |
| 6,995,796 B2 * | 2/2006 | Taubman | ............... H04N 9/045 |
| | | | 348/279 |

(Continued)

FOREIGN PATENT DOCUMENTS

| | | |
|---|---|---|
| CN | 101311804 A | 11/2008 |
| JP | 2006071891 A | 3/2006 |

OTHER PUBLICATIONS

Office Action as received in corresponding Chinese Application No. 2016012101451140, dated Jan. 26, 2016.

*Primary Examiner* — Bumsuk Won
*Assistant Examiner* — Collin X Beatty
(74) *Attorney, Agent, or Firm* — Alston & Bird LLP

(57) ABSTRACT

A color filter substrate is disclosed. The color filter substrate includes a glass substrate, and an RGB color filter layer. The RGB color filter layer includes a plurality of optical filter columns, and each optical filter column includes a plurality of optical filter units in two colors. In addition, adjacent optical filter columns form an optical filter group, optical filter units of one of the colors in each optical filter group are arranged in a zigzag pattern, optical filter units arranged in the zigzag pattern are of different colors in adjacent optical filter groups, and the optical filter units are rectangular.

5 Claims, 3 Drawing Sheets

(56) References Cited

U.S. PATENT DOCUMENTS

| | | | |
|---|---|---|---|
| 2005/0064306 A1* | 3/2005 | Katagami | G02B 5/201 430/7 |
| 2005/0186489 A1* | 8/2005 | Komatsu et al. | 430/7 |
| 2006/0208981 A1* | 9/2006 | Rho | G02F 1/133514 345/88 |
| 2008/0063954 A1* | 3/2008 | Song | G02B 5/201 430/7 |
| 2011/0102662 A1* | 5/2011 | Taguchi | 348/340 |
| 2011/0316955 A1* | 12/2011 | Peregrym | 347/198 |
| 2012/0147468 A1* | 6/2012 | Bell et al. | 359/491.01 |
| 2012/0268820 A1* | 10/2012 | Liang et al. | 359/572 |
| 2012/0300323 A1* | 11/2012 | Matsui et al. | 359/885 |
| 2013/0044384 A1* | 2/2013 | Kim et al. | 359/885 |
| 2014/0210868 A1* | 7/2014 | Cho | G09G 3/3648 345/690 |

\* cited by examiner

---Prior Art---

---Prior Art---

Drive voltage of array substrate of conventional RGB display device

Drive voltage of array substrate of display device in zigzag mode

Drive voltage of array substrate of display device according to an embodiment of the invention

COLOR FILTER SUBSTRATE AND METHOD FOR FABRICATING THE SAME, AND DISPLAY PANEL

CROSS-REFERENCES TO RELATED APPLICATIONS

This application claims the benefit of priority to Chinese Patent Application No. 201310270740.2 filed with the Chinese Patent Office on Jun. 28, 2013 and entitled "Color Filter Substrate and Method for Fabricating the Same, Display Panel and Display Device", the contents of which is incorporated herein by reference in its entirety.

FIELD OF THE INVENTION

The present invention relates to the field of display technologies and particularly to a color filter substrate and a method for fabricating the same, a display panel and a display device.

BACKGROUND OF THE INVENTION

Along with the rapid development of technologies, the performance of display devices of electronic products has been greatly improved, and display devices with large sizes and high resolutions have been widely applied.

While a large-size and high-resolution display device improves a visual experience of a user, it is desirable to address the issue of power consumption arising from the increased size of a screen of the display device. In order to produce a product with lower power consumption while ensuring an exquisite picture, it is currently common to adopt a display device with sources connected in a zigzag pattern, as illustrated in FIG. 1, where pixel elements on an array substrate in the display device are connected in the zigzag pattern, and for convenient identification, the pixel elements of the array substrate are represented respectively by corresponding colored blocks on a color filter substrate. When the display device has the sources connected in the zigzag pattern, cooperates with an IC driver and is driven in a column inverted mode, the display device in the zigzag pattern has the same effect of displaying a picture as that of a display device in a dot inverted mode, that is, has a good display effect; and since the column inverted mode has lower power consumption than the dot inverted mode, the display device in the zigzag pattern has lower power consumption. Additionally, for a conventional RGB display device in a column inverted mode, the dot inverted mode shall be used when the conventional RGB display device needs to present a picture with the same effect as the display device in the zigzag pattern. Consequently, the use of the sources connected in the zigzag pattern can reduce power consumption effectively while ensuring a display effect.

As illustrated in FIG. 2 showing a schematic arrangement diagram of pixel elements of an array substrate of a conventional RGB display device, when the column inverted mode is adopted in both of the display devices in the different source drive modes, corresponding drive voltages are illustrated in FIG. 3 in the case of displaying a monochromatic picture regardless of the display effect, in this case, the drive voltages of the display device in the conventional RGB mode and the display device in the zigzag pattern are equal. When a monochromatic (e.g., red) picture is displayed, if the display device in a zigzag pattern is adopted, then a moment of time corresponding to a high level of the drive voltage is required to match a turn-on moment of time corresponding to red pixel elements in the display device; and if the display device in the conventional RGB mode is adopted, then the value of a high level of the drive voltage is required to be equal to the value of a high level of the drive voltage corresponding to the above mentioned display device in a zigzag pattern while maintaining the high level constant, then a red picture can be presented. As can be apparent, regardless of the quality of presenting the picture, when the picture is displayed by the display device in the zigzag pattern, the drive voltage may be switched between the high and low levels, that is, the voltage may change at a higher frequency, thus resulting in higher power consumption.

In summary, there is a problem of higher power consumption of the display device in a zigzag pattern than a conventional RGB display device regardless of the quality of a picture.

BRIEF SUMMARY OF THE INVENTION

One inventive aspect is a color filter substrate. The color filter substrate includes a glass substrate, and an RGB color filter layer. The RGB color filter layer includes a plurality of optical filter columns, and each optical filter column includes a plurality of optical filter units each being one of two colors. In addition, adjacent optical filter columns form an optical filter group, optical filter units of one of the colors in each optical filter group are arranged in a zigzag pattern, optical filter units arranged in the zigzag pattern are of different colors in adjacent optical filter groups, and the optical filter units are rectangular.

Another inventive aspect is a display panel, including a color filter substrate. The color filter substrate includes a glass substrate, and an RGB color filter layer. The RGB color filter layer includes a plurality of optical filter columns, and each optical filter column includes a plurality of optical filter units each being one of two colors. In addition, adjacent optical filter columns form an optical filter group, optical filter units of one of the colors in each optical filter group are arranged in a zigzag pattern, optical filter units arranged in the zigzag pattern are of different colors in adjacent optical filter groups, and the optical filter units are rectangular.

Another inventive aspect is a method for fabricating a color filter substrate. The method includes forming an RGB color filter layer including a plurality of optical filter columns of different colors on a glass substrate. Each optical filter column includes a plurality of optical filter units each being one of two colors, at least two optical filter units of each color are in each optical filter column, and adjacent optical filter columns form an optical filter group. In addition, optical filter units of one of the colors in each optical filter group are arranged in a zigzag pattern, and optical filter units arranged in the zigzag pattern are of different colors in adjacent optical filter groups, and where the optical filter units are rectangular.

DETAILED DESCRIPTION OF THE INVENTION

In order to address the problem in the prior art of higher power consumption of the display device in a zigzag pattern than a conventional RGB display device, a color filter substrate in an embodiment of the invention includes a glass substrate and an RGB color filter layer on the glass substrate, where the RGB color filter layer includes a plurality of rectangular optical filter units, an optical filter column includes two optical filter units with different colors, the area between every two adjacent optical filter columns there is a data line, and the optical filter units with the same color on the color filter substrate corresponding to a same data line are arranged in a zigzag pattern. With the technical solution of one aspect of the invention, the optical filter units corresponding to a same data line are in same color, and when a monochromatic picture is displayed, a high level of a drive voltage is only needed to input to the data line corresponding to the optical filter units in that color without matching a moment of time corresponding to the high level of the drive voltage to a turn-on moment of time corresponding to pixel elements in that color in the display device, thereby avoiding a higher power consumption due to frequent switching of the drive voltage between the high and low levels.

Preferred embodiments of the invention will be detailed below with reference to the drawings.

Figure 1:
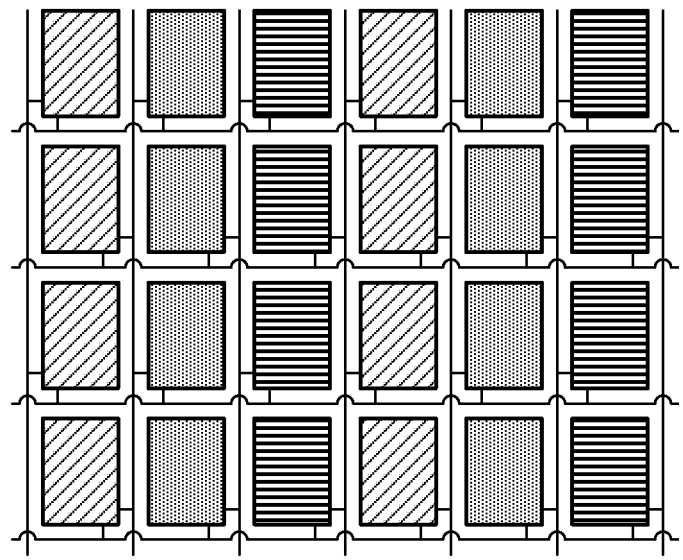
FIG. 1 is a schematic arrangement diagram of pixel elements of an array substrate in a display device in the zigzag pattern in the prior art.
Figure 2:
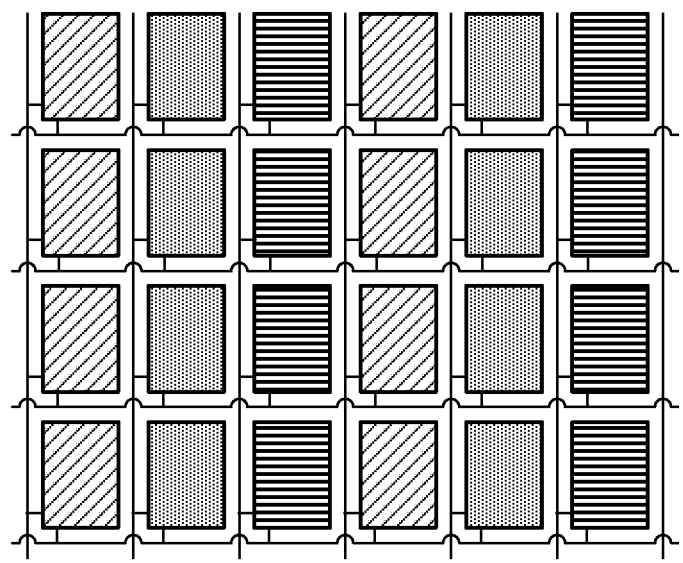
FIG. 2 is a schematic arrangement diagram of pixel elements of an array substrate in a conventional RGB display device in the prior art.
Figure 3:
FIG. 3 is a waveform diagram of drive voltages corresponding respectively to the array substrates of the two different display devices in the prior art.
Figure 3:
Figure 4:
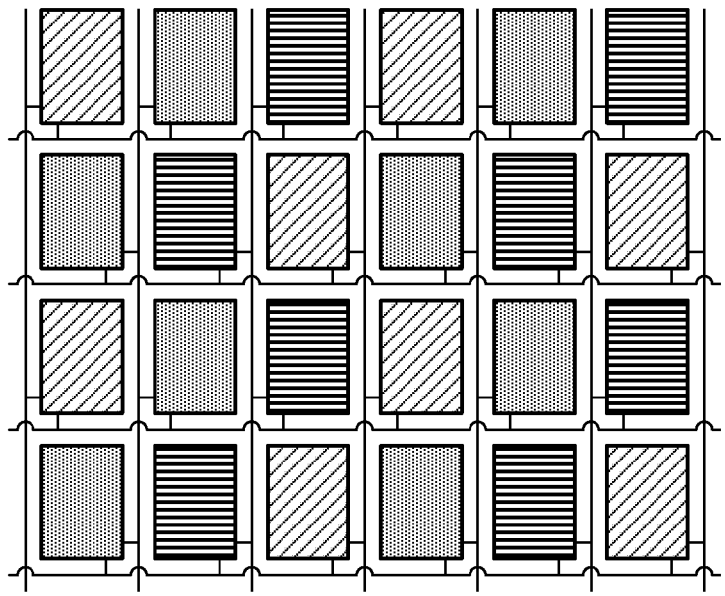
FIG. 4 is a schematic diagram of arrangement of optical filter units in a color filter substrate according to an embodiment of the invention.

Referring to FIG. 4, a color filter substrate according to an embodiment of the invention includes a glass substrate, a black matrix and an RGB color filter layer, where the black matrix is located on the glass substrate, and the RGB color filter layer (color filters) is formed among the black matrix; the RGB color filter layer includes a plurality of optical filter columns, each of which includes a plurality of optical filter units which are in two colors in each optical filter column. The optical filter units can be rectangular colored blocks in the RGB color filter layer. For example, referring to FIG. 4, there are a plurality of red optical filter units and a plurality of green optical filter units included in the first optical filter column, a plurality of green optical filter units and a plurality of blue optical filter units included in the second optical filter column, and a plurality of blue optical filter units and a plurality of red optical filter units included in the third optical filter column.

In the color filter substrate illustrated in FIG. 4, every two adjacent optical filter columns form an optical filter group, each optical filter group includes optical filter units in one color arranged in a zigzag pattern, and optical filter units arranged in the zigzag pattern are in different colors in every two adjacent optical filter groups. For example, referring to the color filter substrate illustrated in FIG. 4, a first optical filter group includes a first optical filter column and a second optical filter column, a second optical filter group includes the second optical filter column and a third optical filter column, and a third optical filter group includes the third optical filter column and a fourth optical filter column, wherein the green optical filter units are arranged in a zigzag pattern in the first optical filter group, the blue optical filter units are arranged in a zigzag pattern in the second optical filter group, and the red optical filter units are arranged in a zigzag pattern in the third optical filter group. With the foregoing technical solution, optical filter units corresponding to a same data line on an array substrate can be in same color, that is, the optical filter units are in one-to-one correspondence to pixel elements in the array substrate, and the pixel elements corresponding to the same color are connected to a same data line, thus ensuring that a color can be presented simply by inputting a high level of a drive voltage to a corresponding data line when a monochromatic picture is displayed.

Additionally, in the embodiment of the invention, the color filter substrate further includes a protective layer above the RGB color filter layer to protect the color filter substrate.

In a process of fabricating a display device, the color filter substrate is located above the array substrate including a plurality of data lines and a plurality of scan lines, where each data line is perpendicular to each scan line, and a pixel element in the array substrate is formed by every two adjacent data lines and every two adjacent scan lines. As can be apparent, in the embodiment of the invention, optical filter units corresponding to a same data line are in a same color, and since the optical filter units on the color filter substrate corresponds to the pixel elements in the array substrate, pixel elements connected with the same data line correspond to a same color. In this case, when a monochromatic picture is displayed, only a high level of the drive voltage is input to the data line corresponding to the optical filter units in the corresponding color without matching a moment of time corresponding to the high level of the drive voltage to a turn-on moment of time corresponding to the pixel elements in the corresponding color in the display device.

Figure 5:
FIG. 5 is a waveform diagram of a drive voltage corresponding to an array substrate of a display device according to an embodiment of the invention.

Referring to FIG. 5 illustrating a waveform diagram of the drive voltage corresponding to the array substrate of the display device according to the embodiment of the invention, with the technical solution of an aspect of the invention, the drive voltage changes at the same frequency as a frequency at which a drive voltage of a display device in a conventional RGB mode changes when a monochromatic picture is displayed, thereby addressing the problem of high power consumption due to frequent switching of the drive voltage between the high and low levels. When a monochromatic picture is displayed, the drive voltage of the display device according to the embodiment of the invention changes at a low frequency, so a drive circuit in the array substrate in the display device can be controlled simply with a low current value, referring to the table below. As can be apparent, the power consumption of the display device according to the technical solution of an aspect of the invention is 50% of that of the display device in a zigzag pattern in the prior art, thereby lowering power consumption.

| Picture displayed | Zigzag pattern in the prior art | Conventional column inverted pattern | Zigzag pattern in the embodiment of the invention |
| --- | --- | --- | --- |
| Red | 151.3 mA | 67.2 mA | 67.2 mA |
| Blue | 151.3 mA | 67.2 mA | 67.2 mA |
| Green | 151.3 mA | 67.2 mA | 67.2 mA |

An embodiment of the invention provides a display panel including the foregoing color filter substrate, and the display panel can be a liquid crystal display panel, or an OLED (Organic Light-Emitting Diode) display panel, or an LTPS (Low Temperature Poly-Silicon) display panel.

Additionally, an embodiment of the invention provides a display device including the foregoing display panel.

Figure 6:
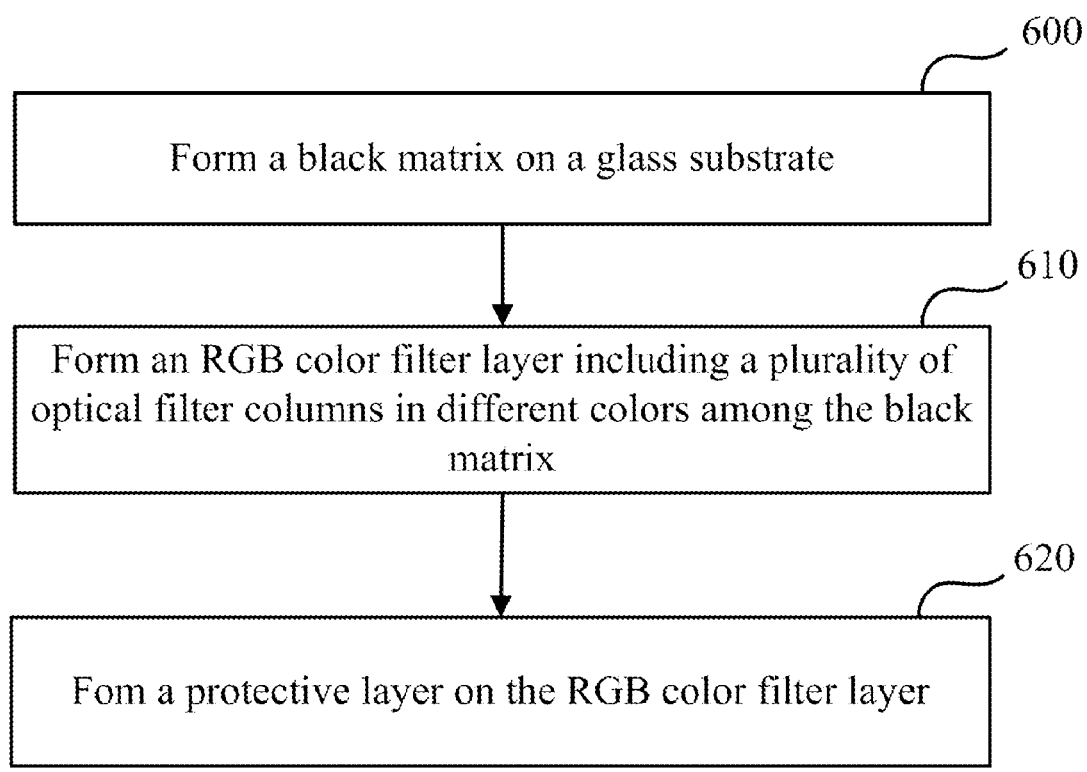
FIG. 6 is a schematic flow chart of fabricating a color filter substrate according to an embodiment of the invention.

Based upon the forgoing color filter substrate, referring to FIG. 6, an embodiment of the invention further provides a method for fabricating a color filter substrate, including the following steps.

The step 600 is to form a black matrix on a glass substrate.

The step 610 is to form an RGB color filter layer including a plurality of optical filter columns in different colors among the black matrix.

Wherein each optical filter column includes a plurality of optical filter units in two colors, and there are at least two optical filter units in each color in each optical filter column, every two adjacent optical filter columns form an optical filter group, optical filter units in one of the colors in each optical filter group are arranged in a zigzag pattern, and optical filter units arranged in the zigzag pattern are in different colors in every two adjacent optical filter groups. The optical filter units can be rectangular colored blocks in the RGB color filter layer.

The step 620 is to form a protective layer on the RGB color filter layer.

In summary, a color filter substrate according to an embodiment of the invention includes a glass substrate, a black matrix and an RGB color filter layer, where the RGB color filter layer includes a plurality of optical filter columns, each optical filter column includes optical filter units in two colors, every two adjacent optical filter columns form an optical filter group, optical filter units in one of the colors in each optical filter group are arranged in a zigzag pattern, and optical filter units arranged in the zigzag pattern are in different colors in every two adjacent optical filter groups. With the technical solution of an aspect of the invention, when a monochromatic picture is displayed, only a high level of a drive voltage is input to a data line corresponding to optical filter units in that color without matching a moment of time corresponding to the high level of the drive voltage to a turn-on moment of time corresponding to pixel elements in that color in a display device, thereby avoiding the problem of higher power consumption due to frequent switching of the drive voltage between the high and low levels.

Evidently those skilled in the art can make various modifications and variations to the invention without departing from the scope of the invention. Thus the invention is also intended to encompass these modifications and variations thereto so long as the modifications and variations come into the scope of the claims appended to the invention and their equivalents.

What is claimed is:

1. A display panel, comprising:
an array substrate, comprising a plurality of data lines and a plurality of scan lines intersecting to form an array of pixel elements, wherein the plurality of data lines are divided into red, green, and blue groups;
a color filter substrate, comprises:
a glass substrate; a RGB color filter layer, arranged in columns and rows of red, green, and blue color filters, in an 1:1 association with the array of pixel elements on the array substrate,
wherein the columns k each includes only two colors of the red, green, blue color filters, k representing the three color filters in a predetermined order,
wherein each even row includes a plurality of the red, green, and blue color filter, arranged along columns k, k+1, and k+2, and
wherein each odd row includes a plurality of the red, green and blue color filters arranged along columns k+2, k+3, and k+4; and
wherein the two colors in each column are driven by two of the three data line groups of the same colors from opposing sides of the column.

2. The display panel according to claim 1, wherein the display panel is a liquid crystal display panel, or an OLED display panel, or a Low Temperature Poly-Silicon display panel.

3. The color filter substrate according to claim 1, wherein the color filter substrate further comprises a black matrix on the glass substrate.

4. The color filter substrate according to claim 1, wherein the color filter substrate further comprises a protective layer on the RGB color filter layer.

5. The color filter substrate according to claim 3, wherein the RGB color filter layer is located on the glass substrate and formed among the black matrix.

* * * * *